(12) United States Patent
Oguma

(10) Patent No.: US 6,733,300 B2
(45) Date of Patent: May 11, 2004

(54) ROTARY CONNECTOR EQUIPPED WITH VERSATILE LEAD BLOCK

(75) Inventor: Takashi Oguma, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 10/188,645

(22) Filed: Jul. 2, 2002

(65) Prior Publication Data

US 2003/0008541 A1 Jan. 9, 2003

(30) Foreign Application Priority Data

Jul. 5, 2001 (JP) .......................... 2001-204857
Jul. 27, 2001 (JP) .......................... 2001-227811

(51) Int. Cl.[7] ................................. H01R 3/00
(52) U.S. Cl. ..................................... 439/15
(58) Field of Search ................... 439/164, 15

(56) References Cited

U.S. PATENT DOCUMENTS

| | | | | |
|---|---|---|---|---|
| 5,230,713 A | * | 7/1993 | Schauer | 29/856 |
| 5,286,219 A | | 2/1994 | Ueno et al. | 439/475 |
| 5,645,441 A | * | 7/1997 | Okuhara et al. | 439/164 |
| 5,683,259 A | * | 11/1997 | Sato | 439/164 |
| 5,951,322 A | | 9/1999 | Nishikigi | 439/456 |
| 5,962,813 A | * | 10/1999 | Shirako et al. | 174/88 R |
| 6,007,355 A | * | 12/1999 | Shibata et al. | 439/164 |
| 6,095,836 A | | 8/2000 | Bolen et al. | 439/164 |
| 6,099,331 A | | 8/2000 | Kikkawa et al. | 439/164 |
| 6,435,885 B2 | * | 8/2002 | Araki et al. | 439/164 |

FOREIGN PATENT DOCUMENTS

| | | |
|---|---|---|
| DE | 43 29 117 A1 | 8/1993 |
| EP | 1 056 166 A2 | 11/2000 |

* cited by examiner

Primary Examiner—Tulsidas C. Patel
(74) Attorney, Agent, or Firm—Brinks Hofer Gilson & Lione

(57) ABSTRACT

At least one of a first and a second lead blocks includes a first and a second base members, the first base member includes a first base portion and N terminals, the terminals include N first and second terminal portions, the second base member includes a second base portion and N or less terminals, the terminals include N or less first and second external terminal portions, the N conductor portions of the flexible cable are connected to the second terminal portions, and the second external terminal portions are connected to some of the first terminal portions.

20 Claims, 15 Drawing Sheets

ROTARY CONNECTOR EQUIPPED WITH VERSATILE LEAD BLOCK

BACKGROUND OF THE INVENTION

1. Field of the Invention

The present invention relates to a rotary connector attached to a steering device of an automobile or the like and used as electrical connection means between electrical devices such as a steering heater device, and an air bag system and the like provided to a vehicle body.

2. Description of the Related Art

Hereinafter, drawings of a conventional rotary connector are explained. FIG. 15 is a plan view showing a conventional rotary connector, FIG. 16 is a main part sectional view taken along line 16—16 in FIG. 15, FIG. 17 relates to the conventional rotary connector and is a perspective view showing a connection state of a lead block and a flexible cable, and FIG. 18 relates to the conventional rotary connector and is an exploded perspective view showing the connection state of the lead block and the flexible cable.

This rotary connector 80 is installed on a steering device (not shown) of an automobile or the like and is used as electrical connection means of a steering heater circuit mounted to a steering wheel, an air bag circuit, a horn circuit, and other switch circuits, and is basically constituted by a pair of a stationary housing 61 and a movable housing 62 concentrically arranged and relatively rotatably coupled with each other, a flexible cable 71 (see FIG. 17) accommodated in a space as an annular cable accommodating portion (not shown) formed between the pair of the stationary and movable housings 61 and 62 to be capable of being wound up and rewound, and a first and a second lead blocks 63 and 64 respectively connected to both end portions of the flexible cable 71.

As shown in FIGS. 17 and 18, the flexible cable 71 includes two insulating films 71a as band-like base films, and plural (for example, ten) conductor portions 71b stuck between the two insulating films 71a and made of very thin band-like copper foils or the like, and the respective conductor portions 71b are stuck in a parallel state.

In the rotary connector 80 basically structured like this, the stationary housing 61 is fixed to a vehicle body (not shown), and the movable housing 62 is fixed to a handle member (not shown), and both ends of the flexible cable 71 are connected to respective electrical devices at the vehicle body and handle side through the respective first and second lead blocks 63 and 64 at the stator side and the movable side, so that it is used as electrical connection means of a steering heater circuit device, a vehicle-mounted air bag system, a horn circuit and the like.

The stationary housing 61 made of synthetic resin material is, as shown in FIG. 15, equipped with a cylindrical outer tube portion 65, a bottom wall 66 provided at an end portion of the outer tube portion 65, and one first receiving body 67 projecting outward from the vicinity of an outer peripheral end of the bottom wall 66.

On the other hand, the movable housing 62 made of synthetic resin material is equipped with a cylindrical inner tube portion 68, an upper wall 69 provided at an end portion of the inner tube portion 68, and one second receiving body 70 projecting outward from the vicinity of an outer peripheral end of the upper wall 69.

The second lead block 64 is, as shown in FIGS. 17 and 18, equipped with one base member 64a made of synthetic resin material, plural (for example, ten) terminals 64b formed at the base member 64a by insert molding and made of metal material, and a hole portion 64c through which part of the terminals 64b pass and in which the partial terminals 64b are exposed.

Besides, the terminals 64b are equipped with first terminal portions 64d projecting outward from the base member 64a, and second terminal portions 64e respectively integrated with the first terminal portions 64d, passing through the hole portion 64c, and exposed. The first terminal portions 64d are straightly extended outward from the root portion of the base member 64a and are aligned on the same straight lines, and the second terminal portions 64e are extended in the direction orthogonal to the first terminal portions 64d.

Besides, the base member 64a includes a rectangular parallelepiped first base portion 64f in which the hole portion 64c is formed, a second base portion 64g extended from one end face of the first base portion 64f in an orthogonal direction, and a third base portion 64h extended from one end face of the second base portion 64g in an upper direction parallel to the first base portion 64f. That is, the whole of the base member 64a is formed into a stair shape with the first base portion 64f, the second base portion 64g, and the third base portion 64h.

In this state, the first terminal portions 64d are extended outward from an upper surface wall of the third base portion 64h.

Besides, the respective conductor portions 71b of the flexible cable 71 are connected to the second terminal portions 64e passing through the hole portion 64c formed in this first base portion 64f by suitable means such as, for example, ultrasonic bonding.

This second lead block 64 is held in the second receiving body 70 of the movable housing 62, and one end portion of the one flexible cable 71 is electrically and mechanically connected to the respective terminals 64b.

The first lead block 63 is equipped with a base portion 63a made of synthetic resin material, plural (for example, ten) terminals 63b formed at the base portion 63a by insert molding and made of metal material, and a hole portion (not shown) through which part of the terminals 63b pass and in which the partial terminals 63b are exposed.

Besides, the terminals 63b are equipped with first terminal portions 63c projecting outward from the base portion 63a, and second terminal portions (not shown) respectively integrated with the first terminal portions 63c, passing through the hole portion (not shown), and exposed.

The first terminal portions 63c are straightly extended from the root portion of the base portion 63a and are aligned on the same straight line, and the second terminal portions (not shown) are extended in the direction orthogonal to the first terminal portions 63c.

That is, this first lead block 63 is formed to have substantially the same structure as the structure of the second lead block 64.

This first lead block 63 is held in the first receiving body 67 of the stationary housing 61, and the other end portion of the one flexible cable 71 connected to the terminals 63b is electrically and mechanically connected to the respective terminals 63b.

Besides, with respect to the respective terminals 63b and 64b of the first and the second lead blocks 63 and 64, two connectors, for example, a first external female connector (not shown) for a steering heater circuit, and a second external female connector (not shown) for an air bag circuit and a horn circuit are respectively inserted in the first and the second receiving bodies 67 and 70, and electrical connection is realized.

Next, here, an attachment structure of the second lead block 64 concerning the foregoing conventional rotary connector 80 to the movable housing 62 will be described by the use of FIG. 16.

At this time, the second lead block 64 is made of the one base member 64a, and the flexible cable 71 (see FIG. 17) is connected to the base member 64a.

In this state, first, the first base portion 64f of the base member 64a of the second lead block 64 is inserted and disposed in a concave portion 68a disposed at a predetermined position of the cylindrical inner tube portion 68 of the movable housing 62.

Next, the upper wall 69 on which the second receiving body 70 is provided is disposed so that the third base portion 64h is attached in the second receiving body 70, and then, the inner tube portion 68 and the upper wall 69 are fixed by suitable means.

In the conventional rotary connector 80, according to the vehicle family of the automobile in which it is to be installed, the grade in the same vehicle family, and the like, the respective connector shapes of external female connectors which can be connected to the respective terminals 63b (first terminal portions 63c) and 64b (first terminal portions 64d) of the first and the second lead blocks 63 and 64, and the number of the respective terminals are varied. Thus, it is necessary to vary the shapes of and the numbers of the first terminal portions 63c and 64d of the first and the second lead blocks 63 and 64 so that they correspond to the respective connector shapes of the external female connectors and the number of the respective terminals.

Besides, the number of the conductor portions 71b of the flexible cable 71 is also varied according to a use, and the flexible cable 71 having a different number of the conductor portions 71b has been used.

However, recently, there has appeared a thing in which irrespective of the vehicle family of an automobile or the grade in the same vehicle family, the number of the respective conductor portions 71b of the flexible cable 71 is set to a maximum number (for example, ten) used for electrical connection between respective electrical devices, this flexible cable 71 is used in common, and only the lead blocks 63 and 64 are varied.

That is, the number of the second terminal portions 64e of the varied lead blocks 63 and 64 is set to the maximum number similarly to the number of the respective conductor portions 71b of the flexible cable 71, the respective conductor portions 71b are connected to the respective second terminal portions 64e, and the shapes of and the number of only the first terminal portions 64d are formed to correspond to the shapes of and the number of the external female connectors. In the conventional example, although the description has been given of the case where the number of the first terminal portions 64d is equal to the number of the second terminal portions 64e, there is a case where the number of the first terminal portions 64d is not larger than the number of the second terminal portions 64e. Thus, eventually, the variety of the lead blocks 63 and 64 is increased.

In other words, in the lead blocks 63 and 64 of the conventional rotary connector 80, for each of external female connectors which can be connected to the respective first terminal portions 64d, it becomes necessary to form all shapes of the lead blocks 63 and 64 to cope with each of them. From this, the variety of the lead blocks 63 and 64 is increased, and in the lead blocks 63 and 64, the structures of the one stair-shaped base member 64a, and the respective terminals 64b formed of the first terminal portions 64d and the second terminal portions 64e, which are subjected to the insert molding and are different in the number, are complicated, and the metal molds of the lead blocks 63 and 64 forming the. complicated structures become necessary, and accordingly, there is a problem that the cost of the rotary connector 80 becomes high.

SUMMARY OF THE INVENTION

The invention has an object to provide an inexpensive rotary connector by simplifying and standardizing a lead block.

A rotary connector of the invention comprises a stationary housing to which a first lead block is attached, a movable housing to which a second lead block is attached and which is rotatably mounted to the stationary housing, and a flexible cable which is accommodated in an accommodating portion formed between the stationary housing and the movable housing, and includes N conductor portions, each of the N conductor portions being connected to each of the first and the second lead blocks, at least one of the first and the second lead blocks includes a first base member and a second base member, the first base member includes a first base portion, and N terminals integrated with the first base portion, the N terminals include N first terminal portions projecting outward from the first base portion, and N second terminal portions exposed from the first base portion, the second base member includes a second base portion and N or less terminals integrated with the second base portion, the N or less terminals include N or less first and second external terminal portions projecting outward from the second base portion, respective terminal portions of the N conductor portions of the flexible cable are connected to the N second terminal portions of the first base member, the N or less respective second external terminal portions of the second base member are connected to some of the N first terminal portions of the first base member, and the first external terminal portions can be connected to an external female connector terminal.

By such structure, since the flexible cable including the N conductor portions and the first base member including the N second terminal portions of the lead block can be made to have versatility and standardized, the variety of the flexible cable and the first base member can be reduced, and further, since it is possible to cope with an external female connector, which can be connected to the respective terminals of the second base member, by changing only the structure of the second base member including the N or less first and second external terminal portions, the flexible cable and the first base member have the versatility, and since the second base member is constituted by only the second base portion and the first and the second external terminal portions projecting outward from the second base portion, the second base member has the simple structure and is inexpensive, and from this, it is possible to provide the rotary connector equipped with the flexible cable having the versatility and the inexpensive lead block.

Besides, in the rotary connector of the invention, the N first terminal portions of the first base member are disposed in a direction orthogonal to a lead direction of the conductor portions of the flexible cable and on the same straight line, and tips of the second external terminal portions of the second base member are disposed on a same straight line.

By such structure, the first terminal portions of the first base member are easily connected to the second external terminal portions of the second base member, and it is possible to provide the rotary connector equipped with the inexpensive lead block.

Besides, in the rotary connector of the invention, the first terminal portions of the first base member are disposed at equal intervals.

By such structure, since the first terminal portions are disposed at equal intervals, the first base member is easily formed, and it is possible to provide the rotary connector equipped with the inexpensive lead block.

Besides, in the rotary connector of the invention, a hole portion is provided in the first base portion of the first base member, and the second terminal portions are exposed from the hole portion.

By such structure, since the second terminal portions are held in a state where they are exposed from the hole portion, the second terminal portions are certainly held to the first base portion, and accordingly, it is possible to provide the rotary connector equipped with the lead block in which the conductor portions of the flexible cable are stably connected to the second terminal portions.

Besides, in the rotary connector of the invention, the first external terminal portions of the second base member are constituted by at least two groups of a first terminal group and a second terminal group different in terminal shape.

By such structure, it is possible to provide the rotary connector equipped with the lead block in which respective external female connectors can be certainly connected to the first and the second terminal groups.

Besides, in the rotary connector of the invention, the first external terminal portions of the second base member are formed of lead wires.

By such structure, it is possible to provide the rotary connector equipped with the lead block which includes the first external portions having flexibility and easy to pull about because of the formation of the lead wires and has a high degree of freedom in attachment.

Besides, the rotary connector of the invention is structured to comprise a stationary housing to which a first lead block is attached, a movable housing to which a second lead block is attached and which is rotatably mounted to the stationary housing, and a flexible cable which is accommodated in an accommodating portion formed between the stationary housing and the movable housing, and includes N conductor portions, each of the N conductor portions being connected to each of the first and the second lead blocks, wherein at least one of the first and the second lead blocks includes a first, a second and a third terminal blocks, the first terminal block includes a first base portion made of insulating material, and N first terminals embedded in and attached to the first base portion, the N first terminals include N terminal portions projecting outward from the first base portion, and N exposed portions electrically connected to the respective terminal portions and exposed from the first base portion, the N respective conductor portions of the flexible cable are connected to the respective exposed portions, the second terminal block includes a second base portion made of insulating material, and N or less second terminals embedded in and attached to the second base portion and equipped with first and second external terminal portions projecting outward from the second base, the third terminal block includes a third base made of insulating material, and N or less third terminals embedded in and attached to the third base and equipped with third and fourth external terminal portions projecting outward from the third base, each of the second and the fourth external terminal portions of the second and the third terminal blocks is connected to any one of the N terminal portions of the first terminal block, and the first and the third external terminal portions can be connected to an external connector terminal.

By such structure, the lead block can be divided into the first, the second, and the third terminal blocks, and the respective structures can be simplified, and by this, a metal mold for molding becomes simple and inexpensive, and the inexpensive rotary connector can be provided.

Besides, the first terminal block can be standardized, the second and the third terminal blocks can also be standardized, and various combinations become applicable by the combination of the second and the third blocks, and an adaptable one can be obtained.

Besides, the rotary connector of the invention is structured such that the N terminal portions of the first terminal block are led out in a direction orthogonal to an extension direction of the conductor portions of the flexible cable, the N terminal portions are disposed on a straight line, and the second and the fourth terminal portions are connected to the N terminal portions on the straight line.

By such structure, the connection of the second and the third blocks to the terminal portions is easy, and it is possible to provide the rotary connector equipped with the inexpensive lead block.

Besides, the rotary connector of the invention is structured such that the N terminal portions of the first terminal block are disposed at equal intervals.

By such structure, since the terminal portions are disposed at equal intervals, the first terminal block can be easily formed, and further, the connection of the second and the third blocks to the terminal portions is easy, and it is possible to provide the rotary connector equipped with the inexpensive lead block.

Besides, the rotary connector of the invention is structured such that a hole portion is provided in the first base, and the exposed portions of the first terminals are exposed from the hole portion.

By such structure, it is possible to provide the rotary connector equipped with the lead block in which the connection of the conductor portions of the flexible cable to the exposed portions is easy, and the connection of both is certain.

Besides, the rotary connector of the invention is structured such that the second and the third bases of the second and the third terminal blocks are disposed side by side in a direction in which they overlap with each other.

By such structure, the second and the fourth external terminal portions of the second and the third terminal blocks can be disposed in a juxtaposition state, and it is possible to provide one which can simply and easily cope with external female connectors, and is small.

Besides, the rotary connector of the invention is structured such that the numbers of the second and the fourth external terminal portions of the second and the third terminal blocks are respectively N/2, and the second and the fourth external terminal portions are alternately connected to the N terminal portions of the first terminal block.

By such structure, the connection of the second and the third terminal blocks to the terminal portions becomes simple and easy, and it is possible to provide one having an excellent productivity.

DETAILED DESCRIPTION OF THE PREFERRED EMBODIMENTS

Figure 1:
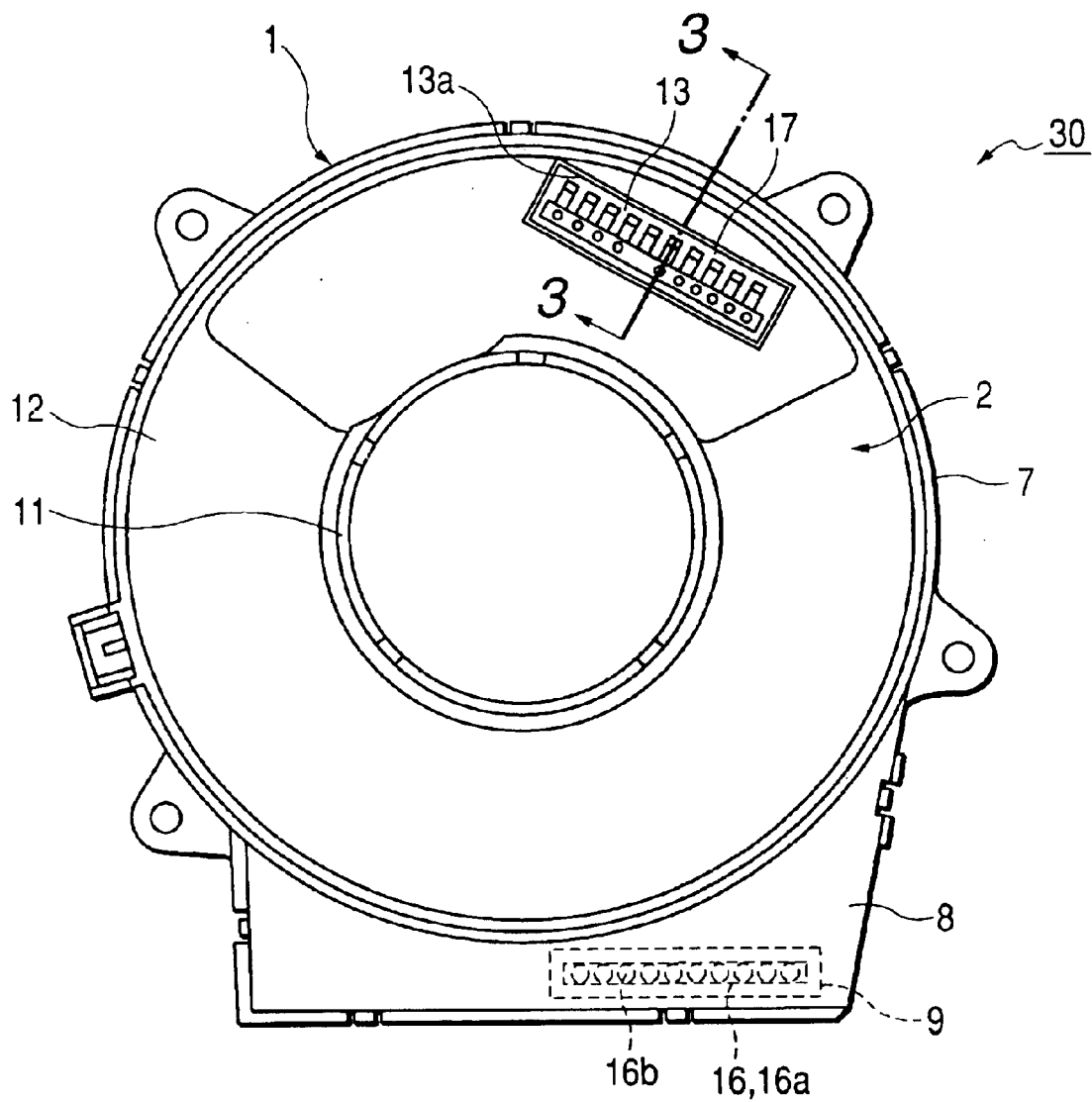
FIG. 1 is a plan view showing a rotary connector of the invention.

Hereinafter, drawings of a rotary connector of the invention are explained. FIG. 1 is a plan view showing the rotary connector of the invention, FIG. 2 relates to the rotary connector of the invention and is a plan view showing a stationary housing and a moving body, FIG. 3 is a main part sectional view taken along line 3—3 in FIG. 1, FIG. 4 relates to the rotary connector of the invention and is a perspective view showing a first embodiment of a connection state of a lead block and a flexible cable, FIG. 5 relates to the rotary connector of the invention and is an exploded perspective view showing the first embodiment of the connection state of the lead block and the flexible cable, FIG. 6 relates to a rotary connector of the invention and is a perspective view showing a second embodiment of a connection state of a lead block and a flexible cable, FIG. 7 relates to the rotary connector of the invention and is an exploded perspective view showing the second embodiment of the connection state of the lead block and the flexible cable, FIG. 8 relates to a rotary connector of the invention and is a perspective view showing a third embodiment of a connection state of a lead block and a flexible cable, and FIG. 9 relates to the rotary connector of the invention and is an exploded perspective view showing the third embodiment of the connection state of the lead block and the flexible cable.

Figure 2:
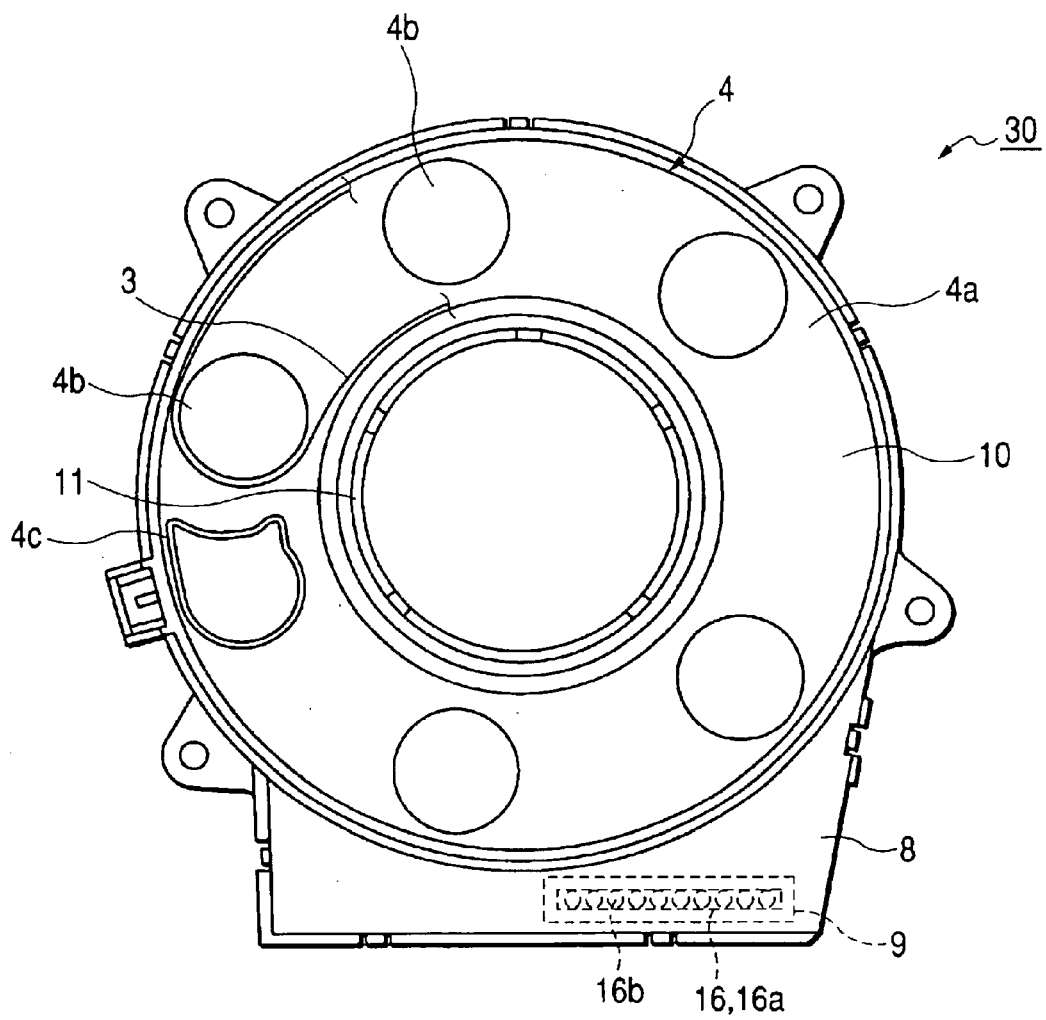
FIG. 2 is a plan view relating to the rotary connector of the invention and showing a stationary housing and a moving body.
Figure 3:
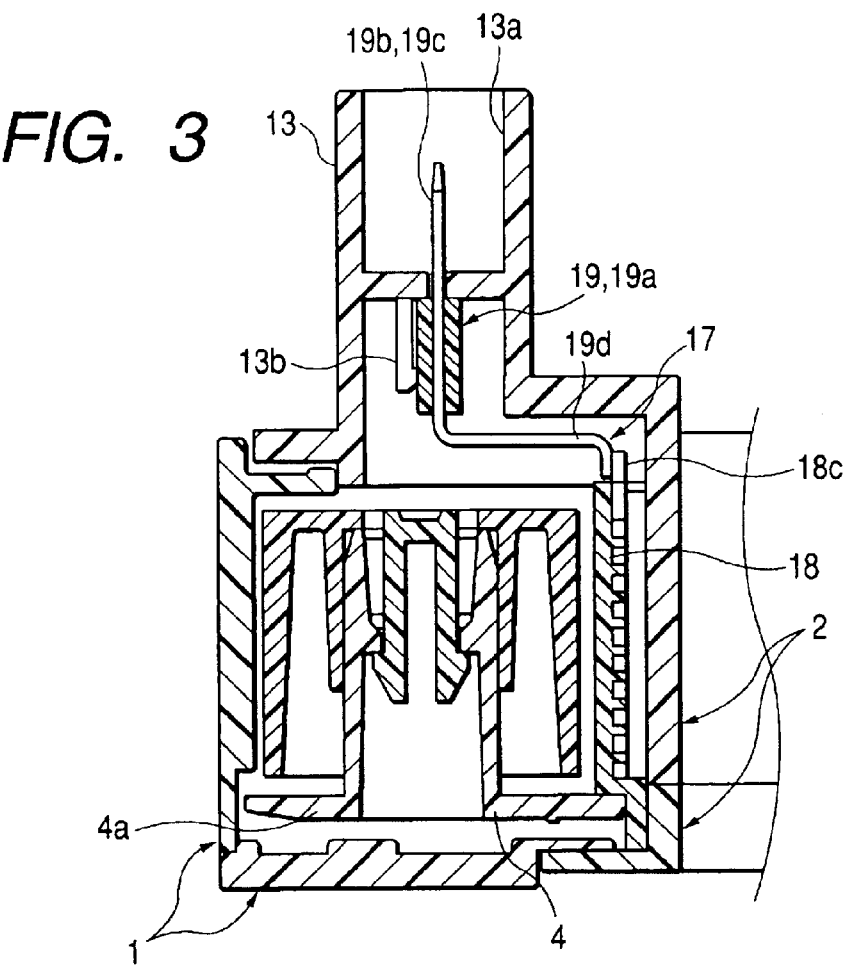
FIG. 3 is a main part sectional view taken along line 3—3 in FIG. 1.

A rotary connector 30 of the invention is roughly constituted by, as shown in FIGS. 1 and 2, a stationary housing 1, a movable housing 2 rotatably mounted to the stationary housing 1, a flexible cable 3 accommodated in an accommodating portion 10 formed between the stationary housing 1 and the movable housing 2, a moving body 4 rotatably disposed between the stationary and the movable housings 1 and 2, and a first and a second lead blocks 16 and 17 to which respective end portions of the flexible cable 3 are connected. At this time, the first lead block 16 is attached to the stationary housing 1, and the second lead block 17 is attached to the movable housing 2.

The stationary housing 1 made of synthetic resin material is equipped with a cylindrical outer tube portion 7, a bottom wall 8 provided at an end portion of the outer tube portion 7, and a cylindrical first receiving body 9 projecting downward from the vicinity of an outer peripheral end of the bottom wall 8.

On the other hand, the movable housing 2 made of synthetic resin material is equipped with a cylindrical inner tube portion 11, an upper wall 12 provided at an end portion of the inner tube portion 11, and a second cylindrical receiving body 13 projecting outward from the vicinity of an outer peripheral end of the upper wall 12. A guide portion 13a for guiding insertion of a connector (not shown) is formed of a cylindrical inner peripheral surface in the second receiving body 13.

The outer tube portion 7 and the inner tube portion 11 are coaxially disposed, the annular accommodating portion 10 is provided between the outer and the inner tube portions 7 and 11, and the moving body 4 is disposed in the accommodating portion 10.

The moving body 4 made of synthetic resin is disposed in the accommodating portion 10 to be movable in a peripheral direction, and includes an annular holding portion 4a, plural rotary members 4b rotatably attached to the holding portion 4a, and a guide member 4c disposed near a predetermined rotary member 4b, for reversing and guiding the flexible cable 3 so as not to buckle it.

Figure 4:
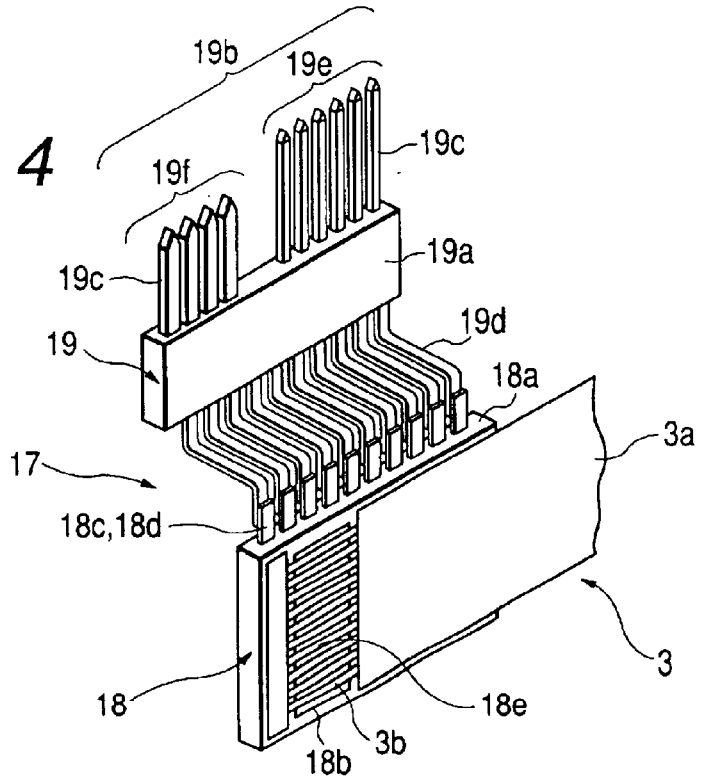
FIG. 4 is a perspective view relating to the rotary connector of the invention and showing a first embodiment of a connection state of a lead block and a flexible cable.
Figure 5:
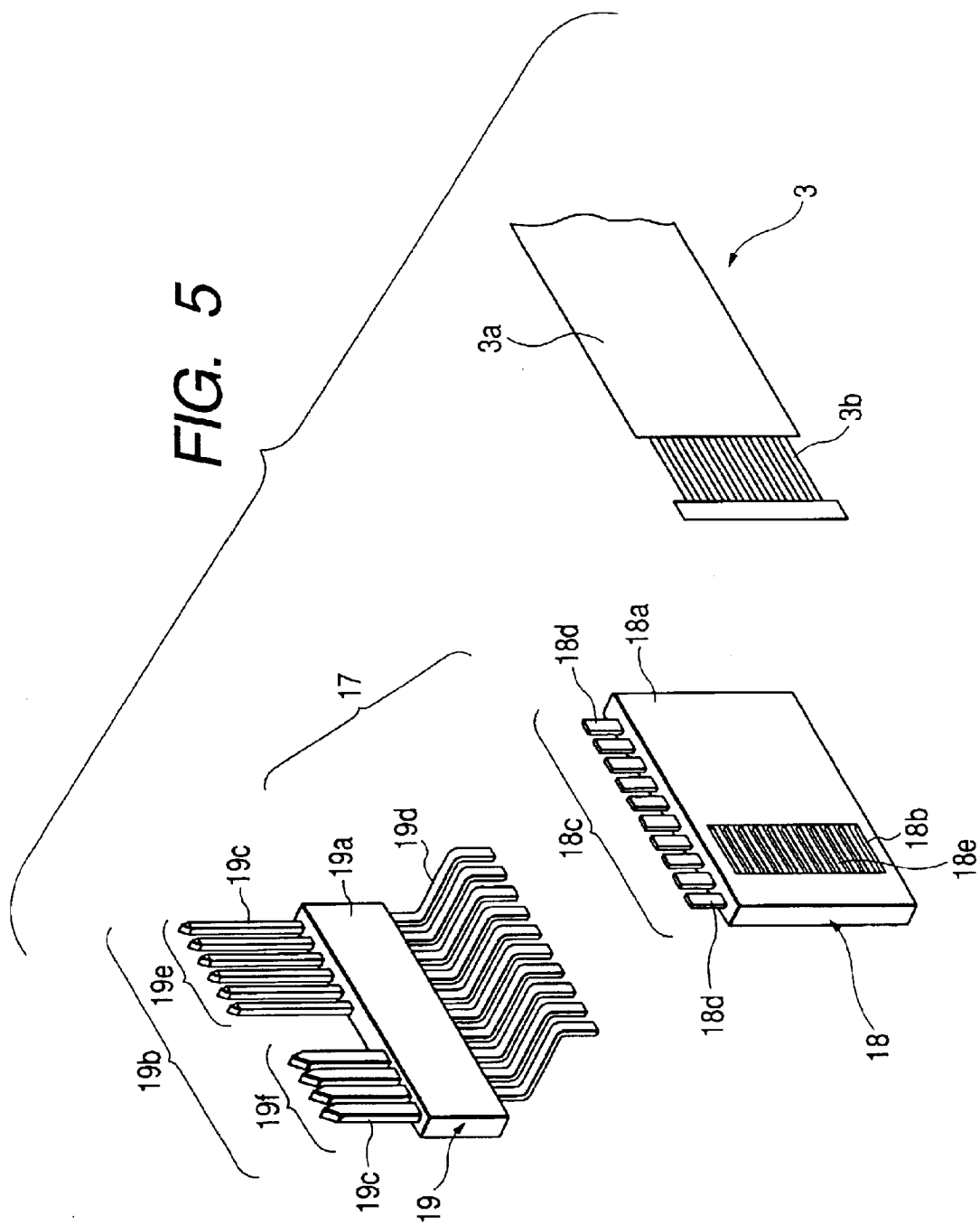
FIG. 5 is an exploded perspective view relating to the rotary connector of the invention and showing the first embodiment of the connection state of the lead block and the flexible cable.

The flexible cable 3 includes, as shown in FIGS. 4 and 5, two insulating films 3a as band-like base films, and plural (for example, ten) conductor portions 3b stuck between the two insulating films 3a and made of very thin band-like copper foils or the like, and is formed in such a state that the respective conductor portions 3b are parallel with each other and are stuck at equal intervals, and both end portions of the respective conductor portions 3b are exposed from the insulating films 3a.

The second lead block 17 is constituted by, as shown in FIGS. 4 and 5, two members of a first base member 18 and a second base member 19 disposed in the vicinity of the first base member 18.

Besides, the first base member 18 is made of synthetic resin material, and includes a rectangular parallelepiped first base portion 18a formed by molding, a hole portion 18b bored through opposite side wall surfaces of the first base portion 18a, and N (for example, ten) first terminals 18c integrally formed with the first base portion 18a by insert molding and made of metal material.

Besides, the N first terminals 18c include N first terminal portions 18d protruded and disposed from an upper wall surface of the first base portion 18a outward on the same straight line at equal intervals, and N second terminal portions 18e exposed from the first base portion 18a in a state of passing through the hole portion 18b in a direction orthogonal to a lead direction of the first terminal portion 18d, and disposed at equal intervals. The respective intervals of the second terminal portions 18e are formed to be equal to the respective intervals of the respective conductor portions 3b of the flexible cable 3.

Besides, the second base member 19 is made of synthetic resin material, and includes a rectangular parallelepiped second base portion 19a formed by molding, and N (for example, ten) or less second terminals 19b integrally formed with the second base portion 19a by insert molding and made of metal material.

Besides, the N or less second terminals 19b include N or less first external terminal portions 19c protruded and disposed from an upper wall surface of the second base portion 19a outward on the same straight line, and N or less second external terminal portions 19d protruded and disposed from a lower wall surface of the second base portion 19a outward on the same straight line at equal intervals. The respective intervals of the second external terminal portions 19d are formed to be equal to the respective intervals of the first terminal portions 18d.

Besides, the first external terminal portions 19c are constituted by two groups of a first terminal group 19e and a second terminal group 19f different in terminal shape. At this time, the first terminal group 19e are formed to be prismatic, and the second terminal group 19f are formed to be sagittal, and further, the terminal portions in the first terminal group 19e and the second terminal group 19f are respectively disposed at equal intervals, a size between the first terminal group 19e and the second terminal group 19f is different from the sizes of the equal intervals, and they are disposed to have the size of a slightly wide interval.

The second external terminal portions 19d are formed to be bent into a stair shape, and the tip ends are arranged on the same straight line.

Besides, the N (for example, ten) first terminal portions 18d of the first base portion 18a are fixed and connected to the N or less second external terminal portions 19d of the second base portion 19a by suitable means such as, for example, spot welding.

By the fixation and connection of the first terminal portions 18d and the second external terminal portions 19d, the first base portion 18a and the second base portion 19a are united through the first terminal portions 18d and the second external terminal portions 19d, and the one second lead block 17 is formed.

Besides, unilateral end portions of the N conductor portions 3b of the flexible cable 3 are electrically and mechanically connected to the N second terminal portions 18e of the first base member 18 by suitable means such as, for example, ultrasonic welding.

At the time of this state, the first terminal portions 18d are disposed in the direction orthogonal to the lead direction of the conductor portions 3b of the flexible cable 3.

Then, by this connection, electrical signals transmitted to the respective conductor portions 3b of the flexible cable 3 are led from first external terminal portions 19c constituted by the first terminal group 19e and the second terminal group 19f of the second lead block 17 to the external female connector (not shown) which can be connected to the first external terminal portions 19c.

Then, this second lead block 17 is disposed in the second receiving body 13 of the movable housing 2. At the time of this state, the first terminal group 19e and the second terminal group 19f of the second lead block 17 are accommodated in the second receiving body 13.

Then, the structure is adopted such that different external female connectors (not shown) are connected to the first and the second terminal groups 19e and 19f.

The first lead block 16 is equipped with, as shown in FIGS. 1 and 2, one base portion 16a made of synthetic resin material, plural (for example, ten) terminals 16b formed at the base portion 16a by insert molding and made of metal material, and a hole portion (not shown) through which part of the terminals 16b pass and in which the partial terminals 16b are exposed. The first lead block 16 is disposed in the first receiving body 9 of the stationary housing 1.

Next, here, an attachment structure of the second lead block 17 relating to the rotary connector 30 of the invention to the movable housing 2 will be described by the use of FIG. 3.

At this time, the first base member 18 of the second lead block 17 and the second base member 19 are united in advance, and the flexible cable 3 is connected to the first base member 18.

In this state, first, the second base member 19 of the second lead block 17 is inserted in the second receiving body 13 of the movable housing 2, the second terminals 19b are projected outward from the second receiving body 13, a pawl portion 13b provided in the second receiving body 13 and a not-shown locking portion of the second base member 19 are snap-coupled, and the second lead block 17 is fixed to the movable housing 2.

Next, the moving body 4 and the movable housing 2 are rotatably attached to the stationary housing 1.

Next, a second embodiment of a connection state of a lead block of a rotary connector of the invention and a flexible cable will be described.

Here, the same structure as the first embodiment is designated by the same symbol, and the detailed description is omitted.

Figure 6:
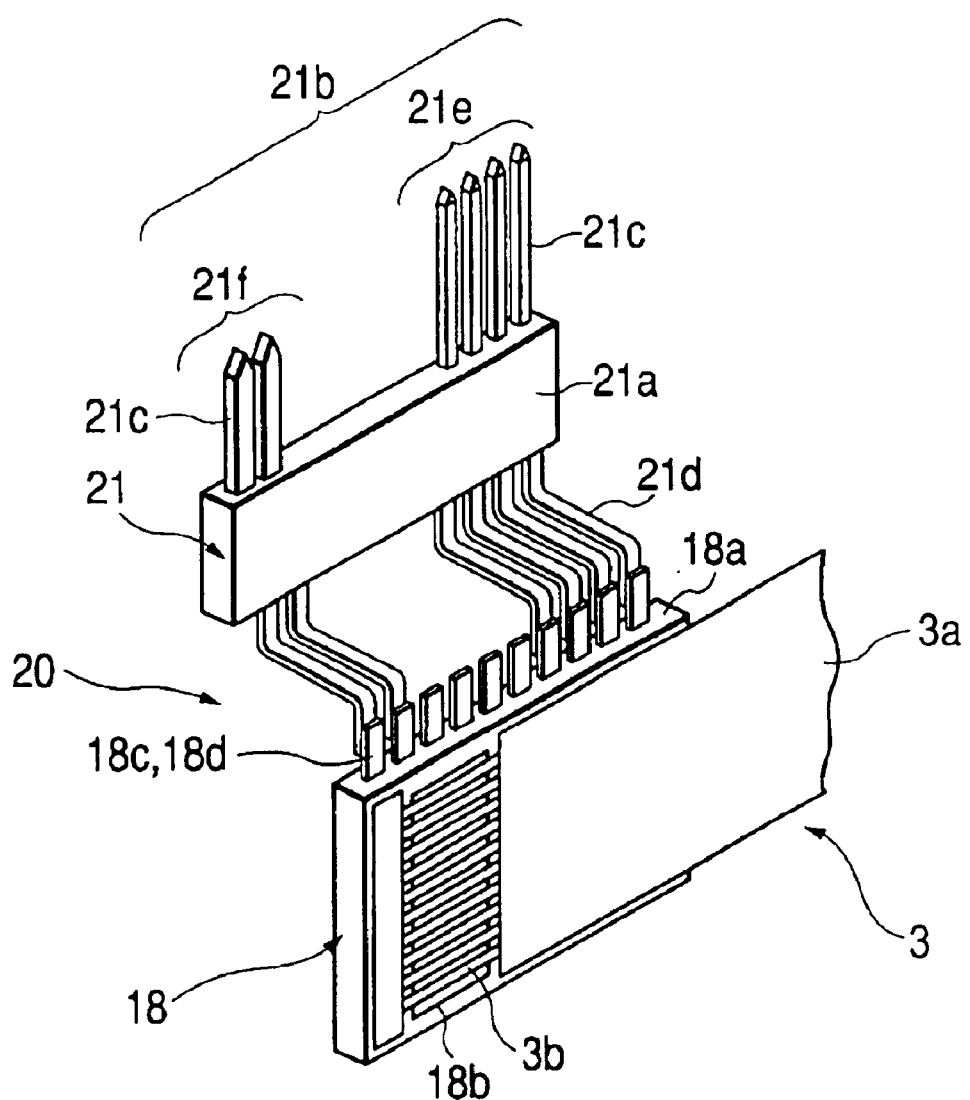
FIG. 6 is a perspective view relating to a rotary connector of the invention and showing a second embodiment of a connection state of a lead block and a flexible cable.
Figure 7:
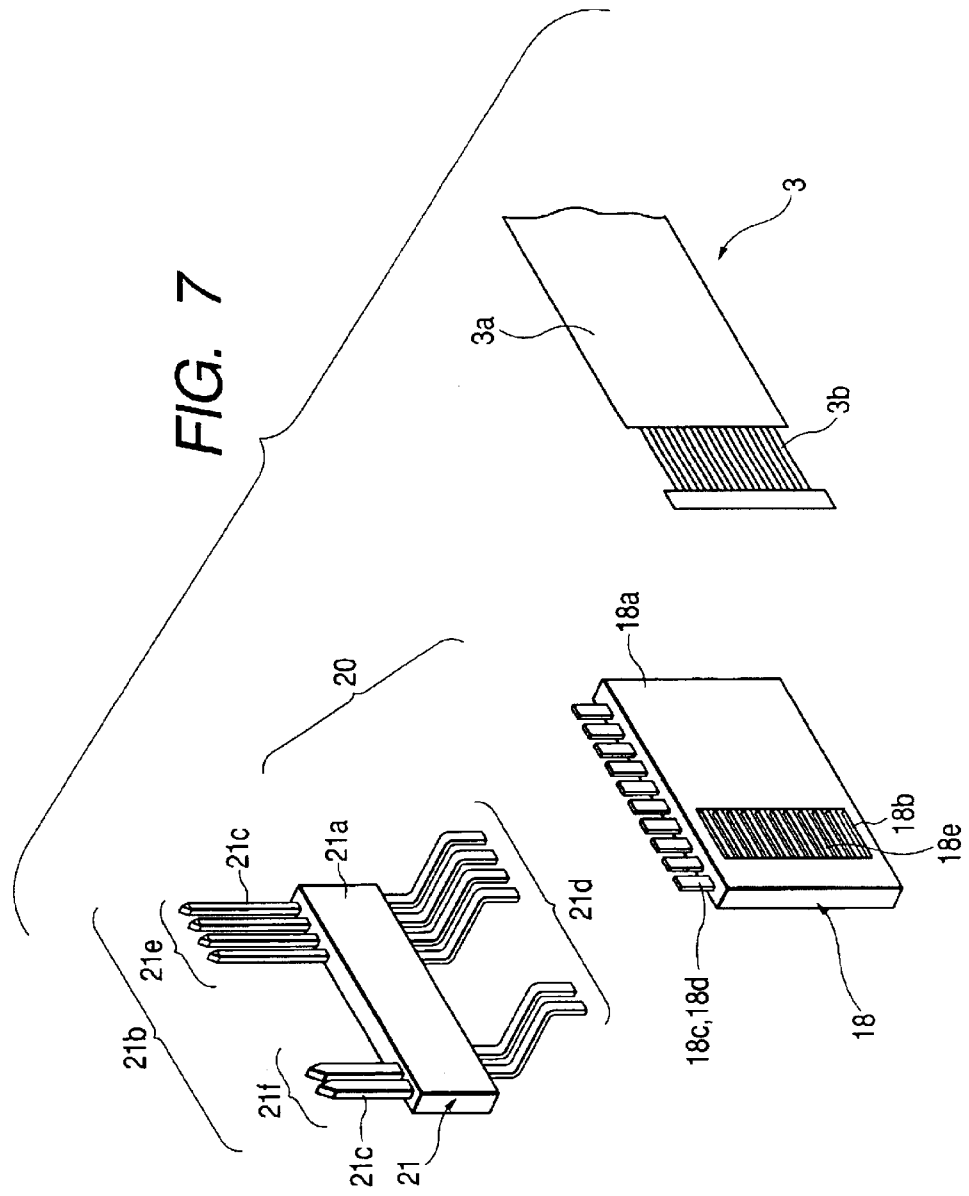
FIG. 7 is an exploded perspective view relating to the rotary connector of the invention and showing the second embodiment of the connection state of the lead block and the flexible cable.

As shown in FIGS. 6 and 7, a flexible cable 3 and a first base member 18 of a second lead block 20 have the same structure as those of the first embodiment, and the disposition (connection) of the flexible cable 3 and the first base member 18 has also the same structure.

A second base member 21 of the second lead block 20 is made of synthetic resin material, and includes a rectangular parallelepiped second base portion 21a made of synthetic resin material and formed by molding, and N (for example, six) or less second terminals 21b integrally formed with the second base portion 21a by insert molding and made of metal material.

Besides, the second terminals 21b includes first external terminal portions 21c protruded and disposed from an upper wall surface of the second base portion 21a outward on the same straight line, and second external terminal portions 21d protruded and disposed from a lower wall surface of the second base portion 21a outward on the same straight line. The respective intervals of the second external terminal portions 21d are formed correspondingly to the positions of the first terminal portions 18d of the first base member 18.

However, the respective intervals of the second external terminal portions 21d are such that as shown in FIG. 6, four terminals are disposed at equal intervals (predetermined intervals) at the right side of FIG. 7, and two terminals are disposed at equal intervals (predetermined intervals) at the left side of FIG. 6.

Then, the second external terminal portions 21d are formed to be bent into a stair shape, and the tips are arranged on the same straight line.

Besides, the first external terminal portions 21c are constituted by a first terminal group 21e of, for example, four terminal portions and a second terminal group 21f of, for example, two terminal portions, which are different in terminal shape. At this time, the first terminal group 21e are formed to be prismatic, and the second terminal group 21f are formed to be sagittal, and further, the terminal portions in the first terminal group 21e and the second terminal group 21f are respectively disposed at equal intervals, a size between the first terminal group 21e and the second terminal group 21f is different from the sizes of the equal intervals, and they are disposed to have the size of a slightly wide interval.

Besides, partial (for example, six) first terminal portions 18d of the N (for example, ten) first terminal portions 18d of the first base portion 18a are fixed and connected to N (for example, six) or less second external terminal portions 21d of the second base portion 21a by suitable means such as, for example, spot welding.

That is, the remaining (for example, four) first terminal portions 18d are disposed not to be connected to the second external terminal portions 21d.

By the fixation and connection of the first terminal portions 18d and the second external terminal portions 21d, the first base portion 18a and the second base portion 21a are united through the first terminal portions 18d and the second external terminal portions 21d, and the one second lead block 20 is formed.

Then, this second lead block 20 is disposed in the second receiving body 13 of the movable housing 2. At the time of this state, the first terminal group 21e and the second terminal group 21f of the second lead block 20 are accommodated in the second receiving body 13.

Next, a third embodiment of a connection state of a lead block of a rotary connector of the invention and a flexible cable will be described.

Here, the same structure as the first embodiment is designated by the same symbol and the detailed description is omitted. Then, here, as shown in FIGS. 8 and 9, a flexible cable 3 and a first base member 18 of a second lead block 24 have the same structure as those of the first embodiment, and the disposition of the flexible cable 3 and the first base member 18 has also the same structure, and accordingly, the description is omitted.

Hereout, next, a second base member 25 of the second lead block 24 will be described.

Figure 8:
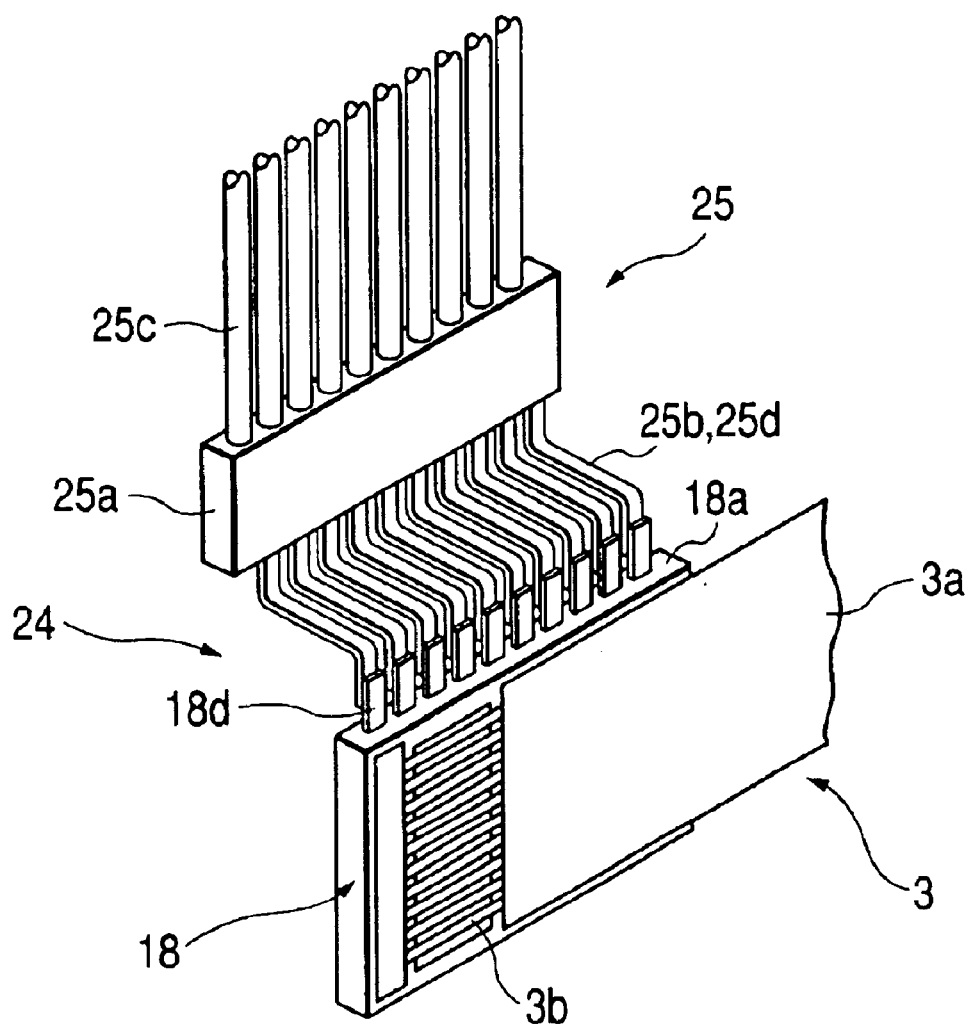
FIG. 8 is a perspective view relating to a rotary connector of the invention and showing a third embodiment of a connection state of a lead block and a flexible cable.
Figure 9:
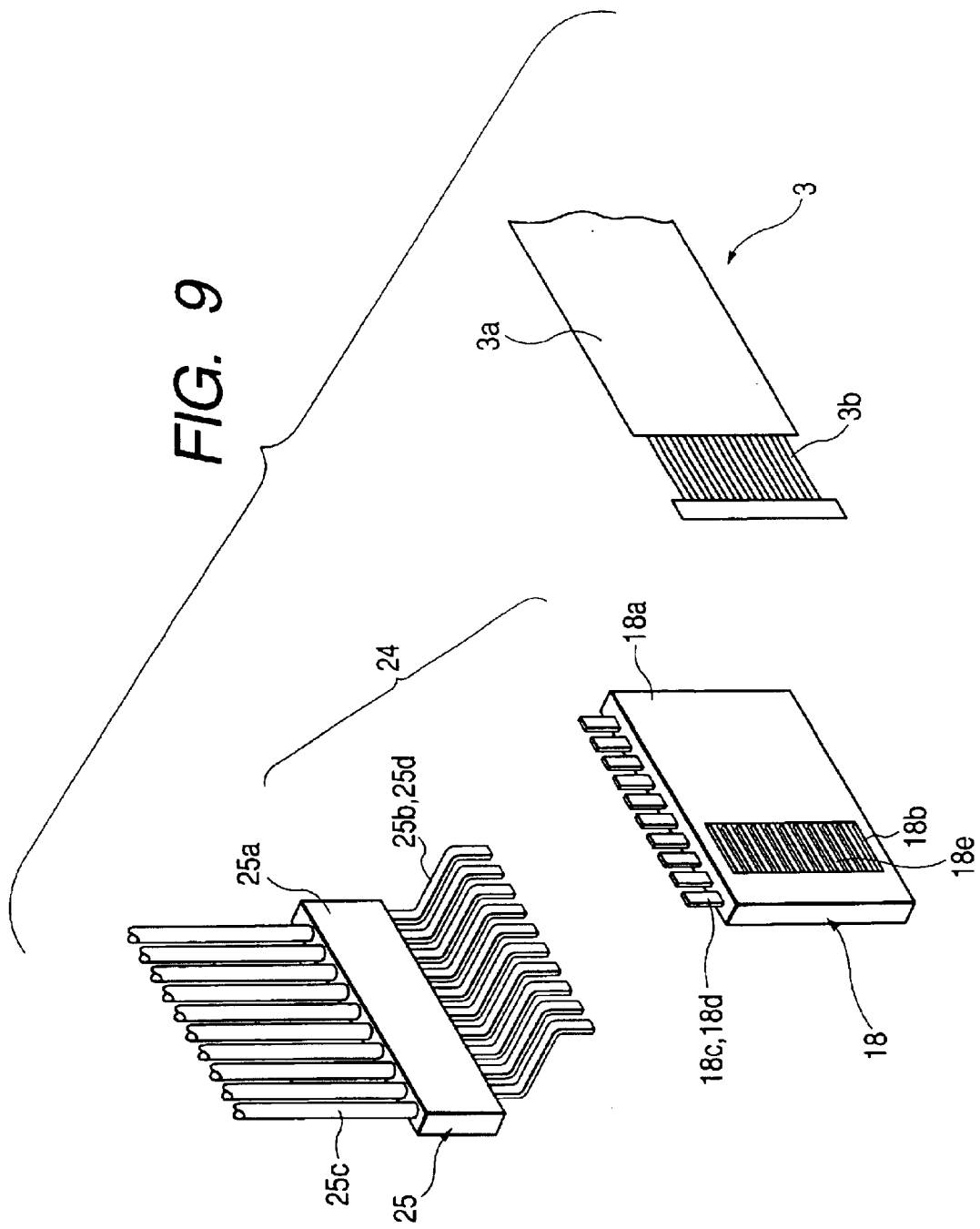
FIG. 9 is an exploded perspective view relating to the rotary connector of the invention and showing the third embodiment of the connection state of the lead block and the flexible cable.

The second base member 25 includes, as shown in FIGS. 8 and 9, a rectangular parallelepiped second base portion 25a made of synthetic resin material and formed by molding, and N (for example, ten) or less second terminals 25b integrally formed with the second base portion 25a by insert molding.

Besides, the N (for example, ten) or less second terminals 25b include N (for example, ten) or less first external terminal portions 25c protruded and disposed outward on the same straight line from an upper wall surface of the second base portion 25a and made of flexible lead wires, and N (for example, ten) or less hard second external terminal portions 25d protruded and disposed outward on the same straight line at equal intervals from a lower wall surface of the second base portion 25a. The respective intervals of the second external terminal portions 25d are formed to be equal to the respective intervals of the first terminal portions 18d of the first base member 18.

Then, the second external terminal portion 25d is formed to be bent substantially into a Z shape, and the tips are arranged on the same straight line.

Besides, N (for example, ten) first terminal portions 18d of the first base portion 18a are fixed and connected to the N (for example, ten) or less second external terminal portions 25d of the second base portion 25a by suitable means such as, for example, spot welding.

By the fixation and connection of the first terminal portions 18d and the second external terminal portions 25d, the first base portion 18a and the second base portion 25a are united through the first terminal portions 18d and the second external terminal portions 25d, and the one second lead block 24 is formed.

Then, this second lead block 24 is disposed in the second receiving body 13 of the movable housing 2.

As described above, the flexible cable 3 of the rotary connector of the invention and the first base member 18 of each of the second lead blocks 17, 20, and 24 have the same structure and the same arrangement in the first, the second and the third embodiments, are standardized, and have versatility.

Then, the respective first external terminal portions 19c, 21c, and 25c of the respective second base members 19, 21 and 25 connectable with external female connectors can be suitably formed to have shapes and structures consistent with the shapes and structures of the respective external female connectors to be connected to the respective first external terminal portions 19c, 21c and 215c.

That is, since the second lead blocks 17, 20 and 24 are constituted by the respective standardized first base members 18, and the respective second base members 19, 21 and 25 which can cope with the individual specifications, they can be connected to the external female connectors by changing the structures of only the respective second base members 19, 21 and 25 to enable connection correspondingly to the specifications of the external female connectors.

Besides, at the time of this state, the size of each of the second lead blocks 17, 20 and 24 of the rotary connector of the invention is formed to be almost equal to the size of the second lead block 64 of the conventional rotary connector. Hereout, the size of each of the second base members 19, 21 and 25 of the second lead blocks 17, 20 and 24 is formed to be light and inexpensive as compared with the weight of the second lead block 64 of the conventional rotary connector.

Besides, since the structure of each of the second base members 19, 21 and 25 includes only the rectangular parallelepiped second base portion and the N or less second terminals integrally formed with the second base portion by insert molding, it has a simple structure and can be formed inexpensively.

Incidentally, in the first and the second embodiments of the invention, the N (for example, ten or six) second terminals 19b and 21b are divided into two terminal groups having different terminal shapes, that is, the first and the second terminal groups 19e, 19f, 21e and 21f, however, a limit is not set to this, but they may be divided into three or more terminal groups, and the terminal shapes may be identical to each other.

Besides, in the foregoing first, second and third embodiments, although only the second lead block is constituted by the first base member and the second base member, a limit is not set to this, but formation may be made so that only the first lead block, or both the first and the second lead blocks are constituted by the first base member and the second base member.

Figure 10:
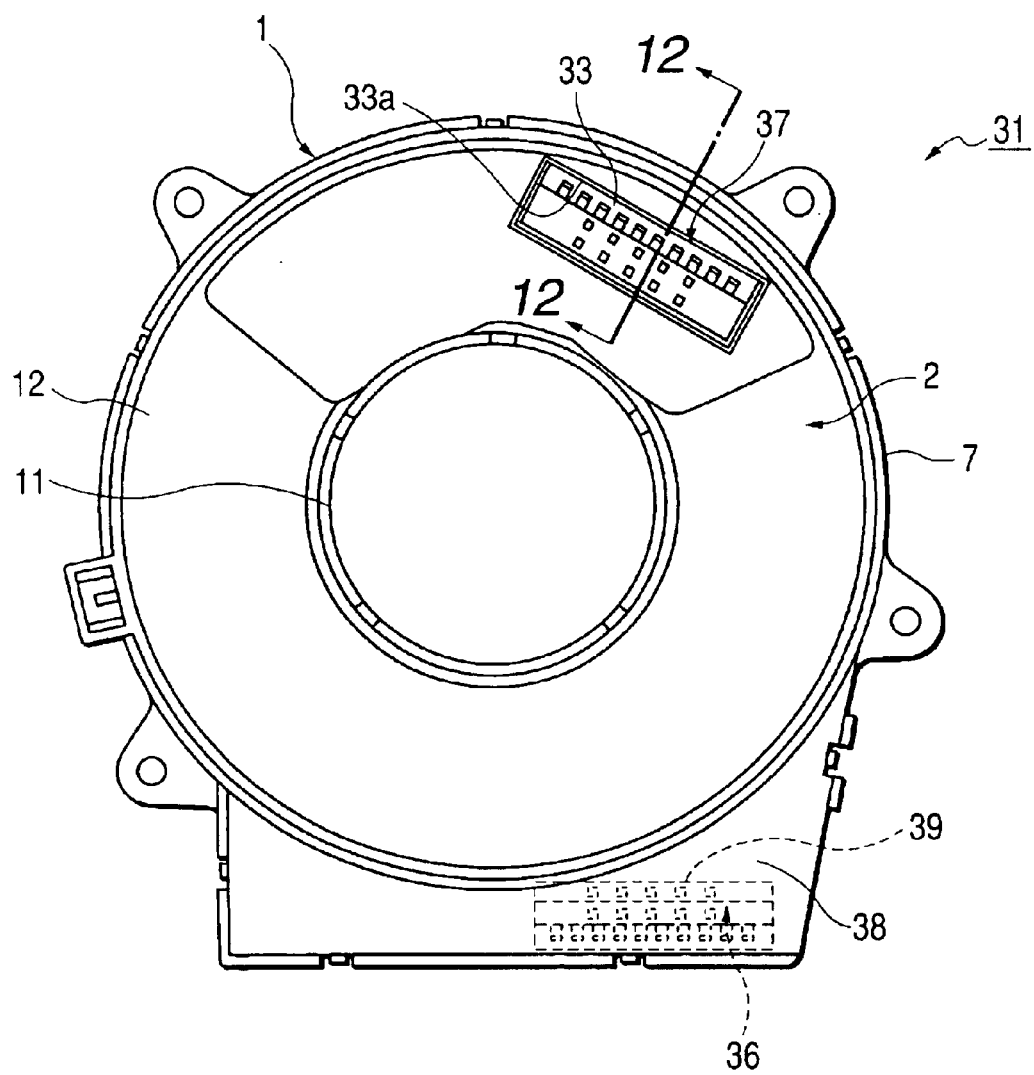
FIG. 10 is a plan view showing a rotary connector of another embodiment of the invention.
Figure 11:
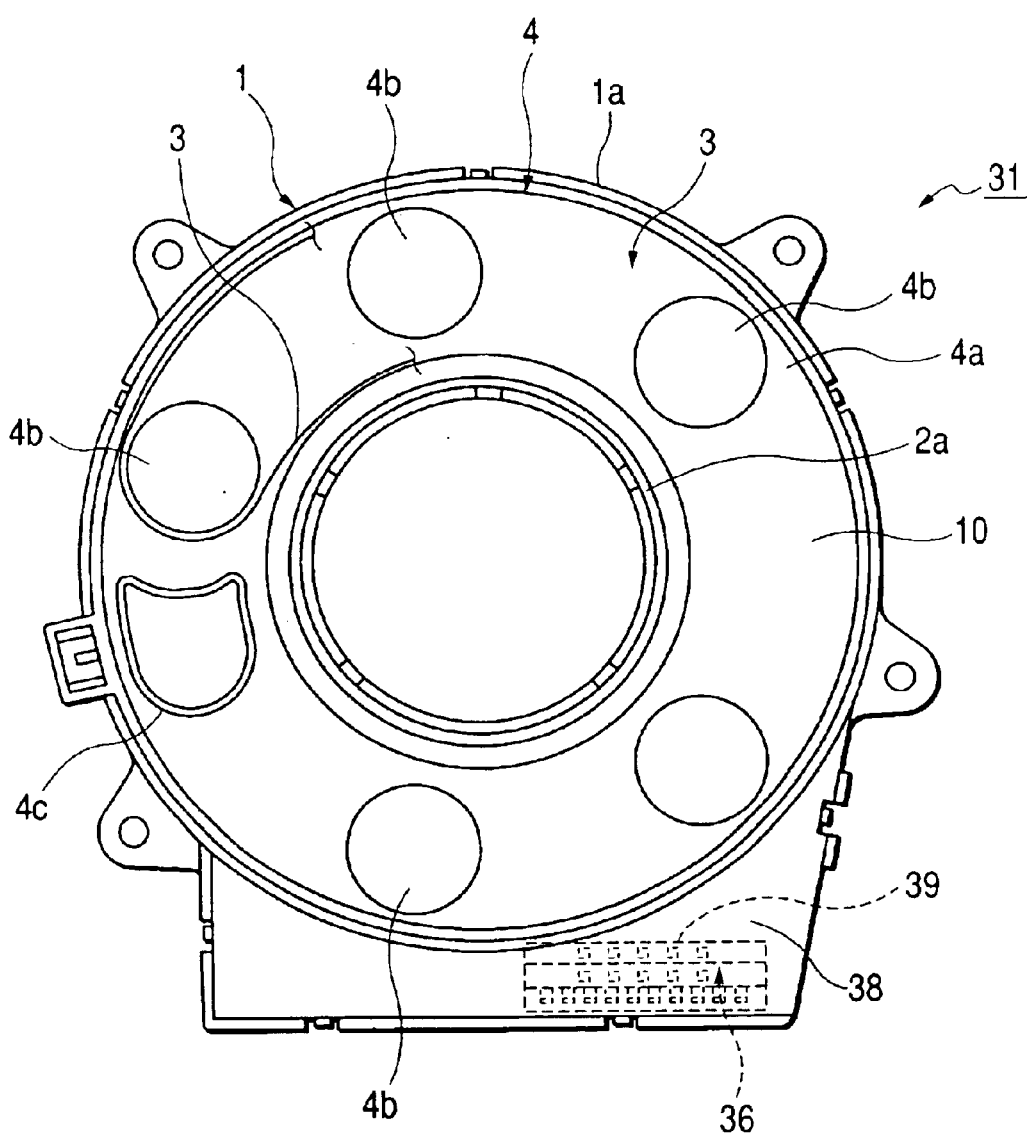
FIG. 11 is a plan view relating to the rotary connector of FIG. 10 and showing a stationary housing and a moving body.
Figure 12:
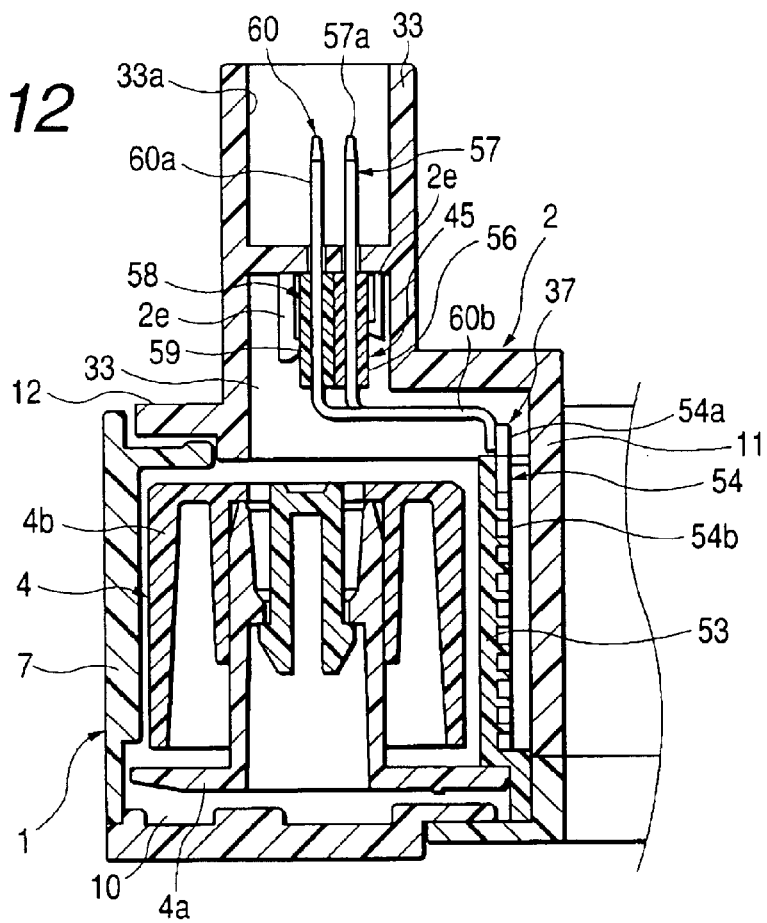
FIG. 12 is a main part sectional view of the rotary connector of FIG. 10.

Next, drawings of a rotary connector of another embodiment of the invention are explained. FIG. 10 is a plan view showing the rotary connector of the other embodiment of the invention, FIG. 11 relates to the rotary connector of FIG. 10 and is a plan view showing a stationary housing and a moving body, FIG. 12 is a main part sectional view of the rotary connector of FIG. 10 taken along line 12—12, FIG. 13 relates to the rotary connector of the invention and is a perspective view showing a connection state of a lead block and a flexible cable, and FIG. 14 relates to the rotary connector of FIG. 10 and is an exploded perspective view showing the connection state of the lead block and the flexible cable.

Here, the same structures as the rotary connector, the lead block, and the flexible cable shown in FIGS. 1 to 9 are designated by the same symbols, and the detailed description is omitted.

Next, the structure of the rotary connector 31 of the other embodiment of the invention will be described. As shown in FIGS. 10 to 12, it is roughly constituted by a stationary housing 1, a movable housing 2 rotatably mounted to the stationary housing 1, a flexible cable 3 accommodated in an accommodating portion 10 formed between the stationary housing 1 and the movable housing 2, a moving body 4 rotatably disposed between the stationary and the movable housings 1 and 2, and a first and a second lead blocks 36 and 37 to which respective end portions of the flexible cable 3 are connected. The first lead block 36 is attached to the stationary housing 1, and the second lead block 37 is attached to the movable housing 2.

The stationary housing 1 made of synthetic resin material is equipped with a cylindrical outer tube portion 7, a bottom wall 38 provided at an end portion of the outer tube portion 7, and a cylindrical first receiving body 39 projecting outward from the vicinity of an outer peripheral end of the bottom wall 38.

On the other hand, the movable housing 2 made of synthetic resin material is equipped with a cylindrical inner tube portion 11, an upper wall 12 provided at an end portion of the inner tube portion 11, and a cylindrical second receiving body 33 projecting outward from the vicinity of an outer peripheral end of the upper wall 12.

A guide portion 33a for guiding the insertion of a connector (not shown) is formed of a cylindrical inner peripheral surface in the second receiving body 33.

The outer tube portion 7 and the inner tube portion 11 are coaxially disposed, the annular accommodating portion 10 is provided between the outer and the inner tube portions 7 and 11, and the moving body 4 is disposed in the accommodating portion 10.

The moving body 4 made of synthetic resin is disposed in the accommodating portion 10 to be movable in the peripheral direction, and includes an annular holding portion 4a, plural rotary members 4b rotatably attached onto the holding portion 4a, and a guide member 4c disposed near a predetermined rotary member 4b, for reversing and guiding the flexible cable 3 so as not to buckle it.

Figure 13:
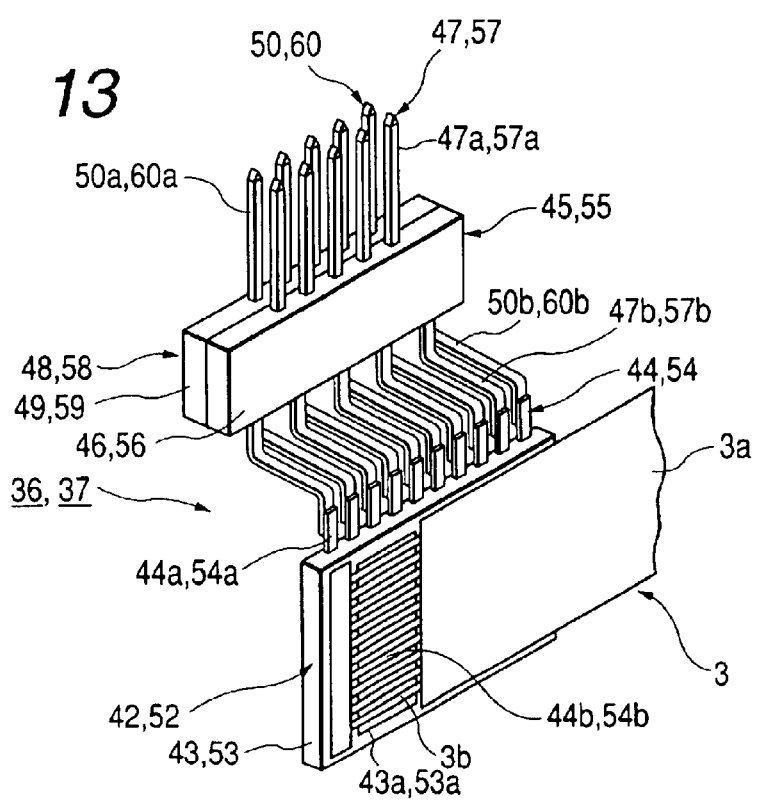
FIG. 13 is a perspective view relating to the rotary connector of FIG. 10 and showing a connection state of a lead block and a flexible cable.
Figure 14:
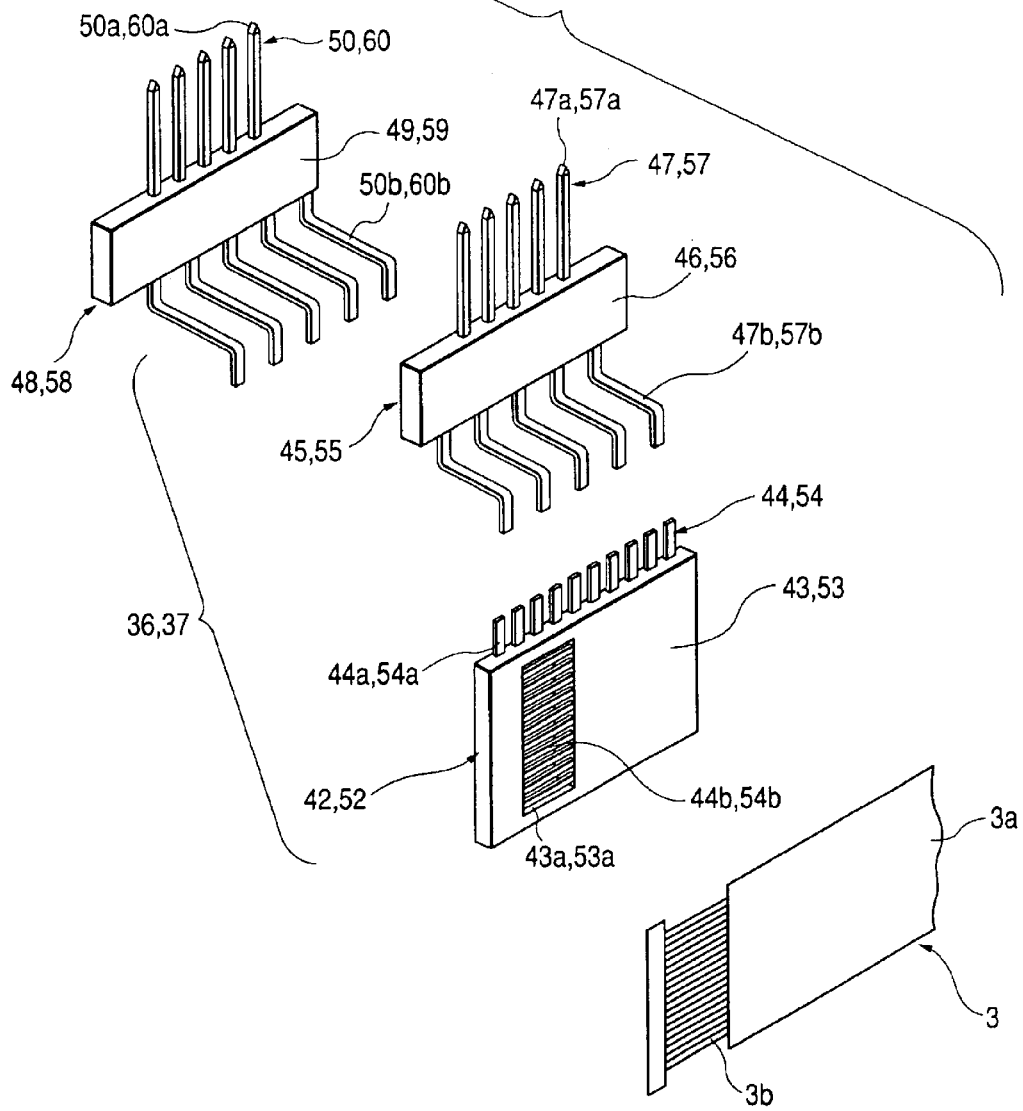
FIG. 14 is an exploded perspective view relating to the rotary connector of FIG. 10 and showing the connection state of the lead block and the flexible cable.
Figure 15:
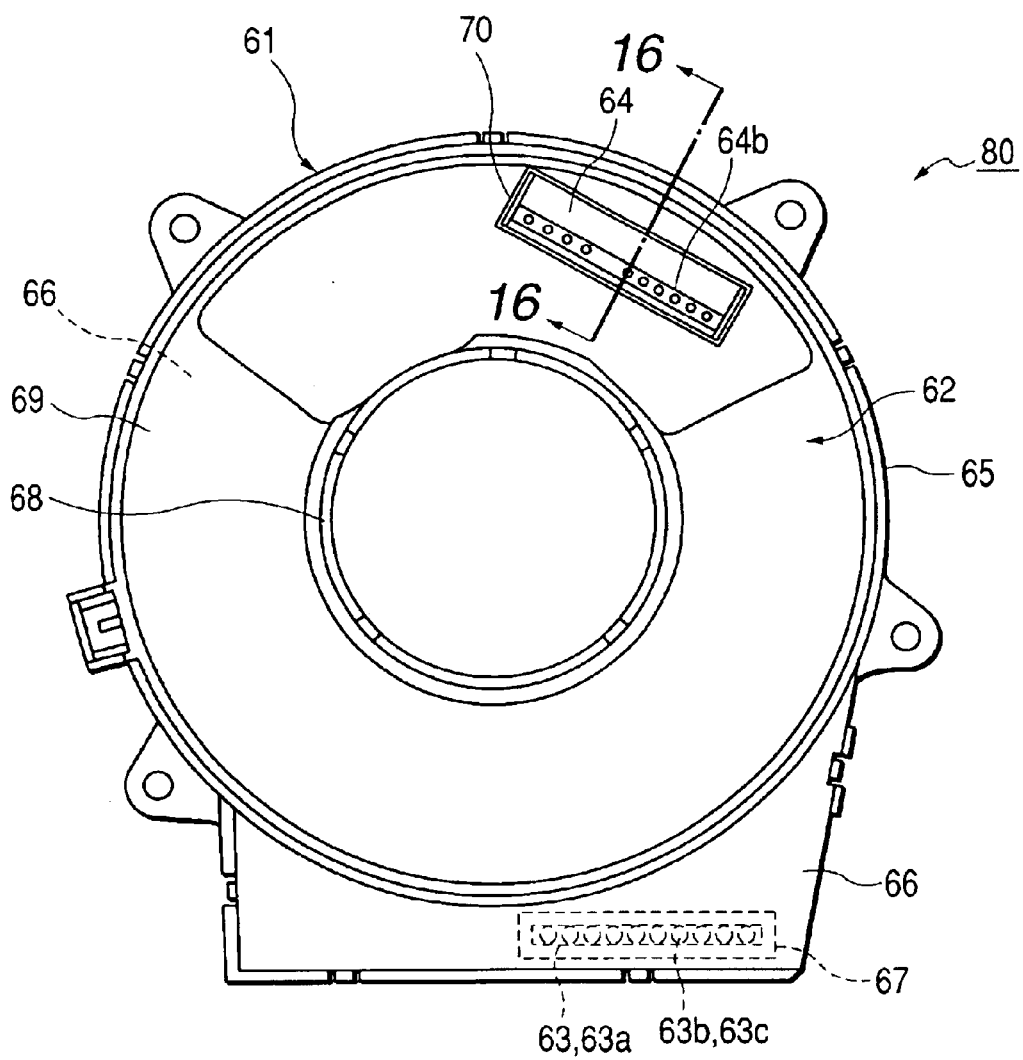
FIG. 15 is a plan view showing a conventional rotary connector.
Figure 16:
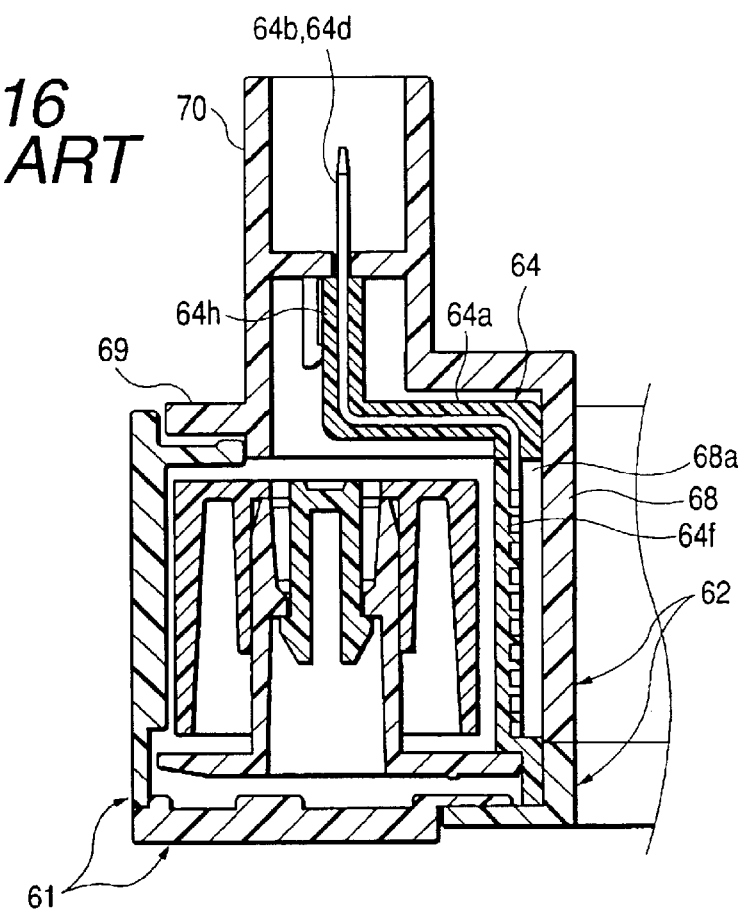
FIG. 16 is a main part sectional view taken along line 16—16 in FIG. 15.
Figure 17:
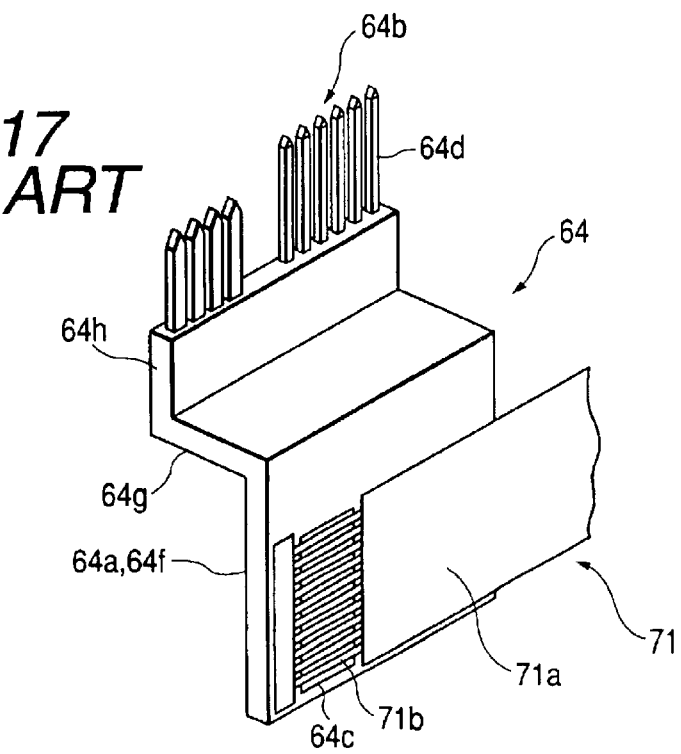
FIG. 17 is a perspective view relating to the conventional rotary connector and showing a connection state of a lead block and a flexible cable.
Figure 18:
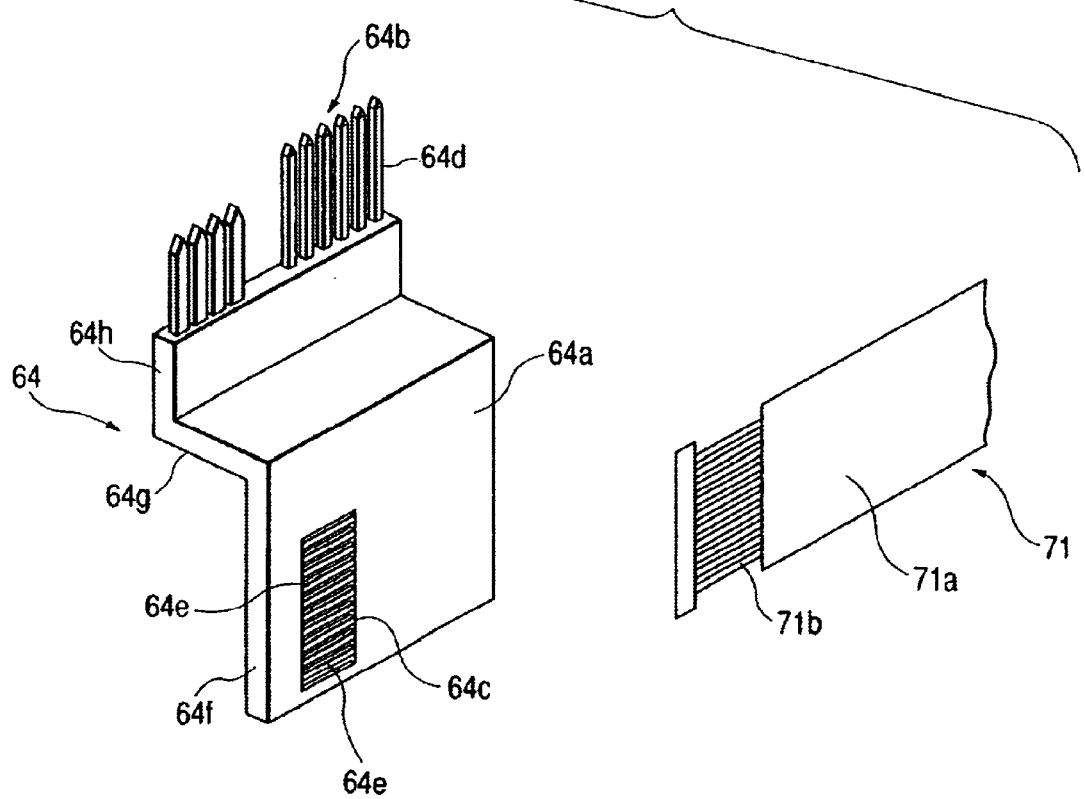
FIG. 18 is an exploded perspective view relating to the conventional rotary connector and showing the connection state of the lead block and the flexible cable.

The flexible cable 3 includes, as shown in FIGS. 13 and 14, two insulating films 3a as band-like base films and plural (for example, ten) conductor portions 3b stuck between the two insulating films 3a and made of very thin band-like copper foils or the like, and is formed in such a state that the respective conductor portions 3b are parallel with each other and are stuck at equal intervals, and both end portions of the respective conductor portions 3b are exposed from the insulating films 3a.

The first and the second lead blocks 36 and 37 are respectively constituted by, as shown in FIGS. 13 and 14, three terminal blocks of first terminal blocks 42 and 52, second terminal blocks 45 and 55, and third terminal blocks 48 and 58.

The respective fist terminal blocks 42 and 52 are made of synthetic resin material, and include rectangular parallelepiped first base portions 43 and 53 formed by molding, through holes 43a and 53a provided in the first base portions 43 and 53, and N (for example, ten) first terminals 44 and 54 which are embedded in and attached to the first base portions 43 and 53 by insert molding, are equipped with terminal portions 44a and 54a and exposed portions 44b and 54b exposed from the holes 43a and 53a, and are made of metal material.

Besides, the terminal portions 44a and 54a of the N first terminals 44 and 54 are protruded and disposed outward from upper wall surfaces of the first base portions 43 and 53 on the same straight lines at equal intervals, and the exposed portions 44b and 54b are exposed from the holes 43a and 53a in the directions orthogonal to the lead directions of the terminal portions 44a and 54a, and disposed on the same straight lines at equal intervals, and the respective intervals of the exposed portions 44b and 54b are formed to be equal to the respective intervals of the respective conductor portions 3b of the flexible cable 3.

Then, the respective conductors 3b at one end side of the flexible cable 3 are connected to the exposed portions 44b and 54b by ultrasonic welding or the like.

Besides, the respective second terminal blocks 45 and 55 are made of synthetic resin material, and include rectangular parallelepiped second base portions 46 and 56 formed by molding, and N (for example, ten) or less second terminals 47 and 57 embedded in and attached to the second base portions 46 and 56 by insert molding, equipped with the first external terminal portions 47a and 57a and the second external terminal portions 47b and 57b, and made of metal material.

Besides, the first external terminal portions 47a and 57a of the N or less second terminals 47 and 57 are protruded and disposed from the upper wall surfaces of the second base portions 46 and 56 outward on the same straight lines, and the second external terminal portions 47b and 57b are protruded and disposed from the lower wall surfaces of the second base portions 46 and 56 outward on the same straight lines at equal intervals, and each of the intervals of the second external terminal portions 47b and 57b is formed to be an interval equal to an interval between adjacent terminal portions at both sides of one terminal portion of the terminal portions 44a and 54a.

Besides, the second external terminal portions 47b and 57b are formed to have the number of N (for example, N/2 or five) or less, and they are formed to be substantially Z-shaped from the second base portions 46 and 56, and further, the interval of the second external terminal portions 47b and 57b is wider than the interval of the first external terminal portions 47a and 57a.

Then, the second external terminal portions 47b and 57b are connected to the terminal portions 44a and 54a of the first terminal blocks 42 and 52 every other terminal portion by spot welding or the like.

Besides, the respective third terminal blocks 48 and 58 are made of synthetic resin material, and include rectangular parallelepiped third base portions 49 and 59 formed by molding, and N (for example, ten or less) third terminals 50 and 60 embedded in and attached to the third base portions 49 and 59 by insert molding, equipped with third external terminal portions 50a and 60a and fourth external terminal portions 50b and 60b, and made of metal material.

The third external terminal portions 50a and 60a of the N or less third terminals 50 and 60 are protruded and disposed from the upper wall surfaces of the third base portions 49 and 59 outward on the same straight lines, the fourth external terminal portions 50b and 60b are protruded and disposed from the lower wall surfaces of the third base portions 49 and 59 outward on the same straight lines at equal intervals, and each of the intervals of the fourth external terminal portions 50b and 60b is formed to be an interval equal to an interval between adjacent terminal portions at both sides of one terminal portion of the terminal portions 44a and 54a.

Besides, the fourth external terminal portions 50b and 60b are formed to have the number of N (for example, N/2 or five) or less, and are formed from the third base portions 49 and 59 to be substantially Z-shaped, and the interval of the fourth external terminal portions 50b and 60b is wider than the interval of the third external terminal portions 50a and 60a.

Then, the fourth external terminal portions 50b and 60b are connected by spot welding or the like to the terminal portions 44a and 44b of the first terminal blocks 42 and 52 every other terminal portion and to the places, every other terminal portion, of the terminal portions 44a and 54a of the first terminal blocks 42 and 52 where the second external terminal portions 47b and 57b are not connected.

When the third terminal blocks 48 and 58 are attached, the state is such that the second base portions 46 and 56 and the third base portions 49 and 59 are disposed side by side in the direction in which they overlap with each other back to back, and the first external terminal portions 47a and 57a and the third external terminal portions 50a and 60a are disposed side by side.

In this way, the first and the second lead blocks 36 and 37 are formed, and the conductor portions 3b of the flexible cable 3 are electrically and mechanically connected to the exposed portions 44b and 54b of the first terminal blocks 42 and 52 by suitable means such as ultrasonic welding.

At this time, the second external terminal portions 47b and 57b and the third external terminal portions 50a and 60a are disposed in the direction orthogonal to the lead direction of the conductor portions 3b of the flexible cable 3.

Then, by this connection, electric signals transmitted through the respective conductor portions 3b of the flexible cable 3 are led to external female connectors (not shown) connectable to the first and the second lead blocks 36 and 37.

Then, the first lead block 36 is accommodated in the first receiving body 39 of the stationary housing 1, and the second lead block 37 is accommodated in the second receiving body 33 of the movable housing 2, and especially as shown in FIG. 12, the second and the third base portions 56 and 59 of the second and the third terminal blocks 55 and 58 are snap-fastened by a locking piece 2e of the movable housing 2.

Then, according to the vehicle family of the automobile to which the rotary connector is attached, the grade in the same vehicle family, and the like, the number of the second terminals 47 and 57 of the second terminal blocks 45 and 55 of the first and the second lead blocks 36 and 37 and the numbers of the third terminals 50 and 60 of the third terminal blocks 48 and 58, and the lead places from the first terminals 44 and 54 are varied, and the respective terminals are connected to the external female connectors.

In this embodiment, although the description has been given of the case where the number (N) of the terminals of the second terminal blocks 45 and 55 and the third terminal blocks 48 and 58 are five (maximum number) respectively, the second terminal blocks 45 and 55 and the third terminal blocks 48 and 58 are variously prepared in which the number of terminals and the lead places from the first terminals 44 and 54 are varied, and by various combining the terminal blocks of both, it is possible to cope with the vehicle family of the automobile, the grade in the same vehicle family, and the like.

As described above, in a rotary connector of the invention, at least one of a first and a second lead blocks includes a first base member and a second base member, the first base member includes a first base portion, and N terminals integrated with the first base portion, the N terminals include N first terminal portions projecting outward from the first base portion, and N second terminal portions exposed from the first base portion, the second base member includes a second base portion and N or less terminals integrated with the second base portion, the N or less terminals include N or less first and second external terminal portions projecting outward from the second base portion, respective end portions of the N conductor portions of the flexible cable are connected to the N second terminal portions of the first base member, the N or less respective second external terminal portions of the second base member are connected to some of the N first terminal portions of the first base member, and the first external terminal portions can be connected to an external female connector terminal, whereby the flexible cable and the first base member of the lead block can be standardized, and it is possible to cope with a connectable external female connector by changing only the second base member, and therefore, it is possible to provide the rotary connector equipped with the inexpensive lead block having versatility.

Besides, a rotary connector of the invention comprises a stationary housing to which a first lead block is attached,
  a movable housing to which a second lead block is attached and which is rotatably mounted to the stationary housing, and
  a flexible cable which is accommodated in an accommodating portion formed between the stationary housing and the movable housing, and includes N conductor portions, each of the N conductor portions being connected to each of the first and the second lead blocks, wherein at least one of the first and the second lead blocks includes a first, a second and a third terminal blocks, the first terminal block includes a first base portion made of insulating material, and N first terminals embedded in and attached to the first base, the N first terminals include N terminal portions projecting outward from the first base portion, and N exposed portions electrically connected to the respective terminal portions and exposed from the first base portion, the N respective conductor portions of the flexible cable are connected to the respective exposed portions, the second terminal block includes a second base portion made of insulating material, and N or less second terminals embedded in and attached to the second base portion and equipped with first and second external terminal portions projecting outward from the second base portion, the third terminal block includes a third base portion made of insulating material, and N or less third terminals embedded in and attached to the third base portion and equipped with third and fourth external terminal portions projecting outward from the third base portion, and each of the second and the fourth external terminal portions of the second and the third terminal blocks is connected to any one of the N terminal portions of the first terminal block, and the first and the third external terminal portions can be connected to an external connector terminal, whereby the lead block can be divided into the first, the second and the third terminal blocks, and the respective structures can be simplified, and by this, a metal mold for molding becomes simple and inexpensive, and the inexpensive rotary connector can be provided.

What is claimed is:

1. A rotary connector comprising:

a stationary housing to which a first lead block is attached;

a movable housing to which a second lead block is attached and which is rotatably mounted to the stationary housing; and a flexible cable which is accommodated in an accommodating portion formed between the stationary housing and the movable housing, and includes N conductor portions, each of the N conductor portions being connected to each of the first and the second lead blocks, wherein at least one of the first and the second lead blocks includes a first base member and a second base member, the first base member includes a first base portion, and N terminals integrated with the first base portion, the N terminals include N first terminal portions projecting outward from the first base portion, and N second terminal portions exposed from the first base portion, the second base member includes a second base portion and at most N terminals integrated with the second base portion, the at most N terminals include at most N first and second external terminal portions projecting outward from the second base portion, respective end portions of the N conductor portions of the flexible cable are connected to the N second terminal portions of the first base member, the at most N respective second external terminal portions of the second base member are connected to some of the N first terminal portions of the first base member, and the first external terminal portions are connectable to an external female connector terminal.

2. A rotary connector according to claim 1, wherein the N first terminal portions of the first base member are disposed in a direction orthogonal to a lead direction of the conductor portions of the flexible cable and on a same straight line, and tips of the second external terminal portions of the second base member are disposed on a same straight line.

3. A rotary connector according to claim 1, wherein the first terminal portions of the first base member are disposed at equal intervals.

4. A rotary connector according to claim 1, wherein a hole portion is provided in the first base portion of the first base member, and the second terminal portions are exposed from the hole portion.

5. A rotary connector according to claim 1, wherein the first external terminal portions of the second base member are constituted by at least two groups of a first terminal group and a second terminal group different in terminal shape.

6. A rotary connector according to claim 1, wherein the first external terminal portions of the second base member are formed of lead wires.

7. A rotary connector comprising:

a stationary housing to which a first lead block is attached;

a movable housing to which a second lead block is attached and which is rotatably mounted to the stationary housing; and a flexible cable which is accommodated in an accommodating portion formed between the stationary housing and the movable housing, and includes N conductor portions, each of the N conductor portions being connected to each of the first and the second lead blocks, wherein at least one of the first and the second lead blocks includes a first, a second and a third terminal blocks, the first terminal block includes a first base portion made of insulating material, and N first terminals embedded in and attached to the first base portion, the N first terminals include N terminal portions projecting outward from the first base portion, and N exposed portions electrically connected to the respective terminal portions and exposed from the first base portion, the N respective conductor portions of the flexible cable are connected to the respective exposed portions, the second terminal block includes a second base portion made of insulating material, and at most N second terminals embedded in and attached to the second base portion and equipped with first and second external terminal portions projecting outward from the second base portion, the third terminal block includes a third base portion made of insulating material, and at most N third terminals embedded in and attached to the third base portion and equipped with third and fourth external terminal portions projecting outward from the third base portion, each of the second and the fourth external terminal portions of the second and the third terminal blocks is connected to any one of the N terminal portions of the first terminal block, and the first and the third external terminal portions are connectable to an external connector terminal.

8. A rotary connector according to claim 7, wherein the N terminal portions of the first terminal block are led out in a direction orthogonal to an extension direction of the conductor portions of the flexible cable, the N terminal portions are disposed on a straight line, and the second and the fourth external terminal portions are connected to the N terminal portions on the straight line.

9. A rotary connector according to claim 7, wherein the N terminal portions of the first terminal block are disposed at equal intervals.

10. A rotary connector according to claim 7, wherein a hole portion is provided in the first base, and the exposed portions of the first terminals are exposed from the hole portion.

11. A rotary connector according to claim 7, wherein the second and the third bases of the second and the third terminal blocks are disposed side by side in a direction in which they overlap with each other.

12. A rotary connector according to claim 7, wherein the numbers of the second and the fourth external terminal portions of the second and the third terminal blocks are respectively N/2, and the second and the fourth external terminal portions are alternately connected to the N terminal portions of the first terminal block.

13. A rotary connector comprising:
  a stationary housing to which a first lead block is attached;
  a movable housing to which a second lead block is attached and which is rotatably mounted to the stationary housing; and
  a flexible cable which is accommodated in an accommodating portion formed between the stationary housing and the movable housing, and includes N conductor portions, each of the N conductor portions being connected to each of the first and the second lead blocks, wherein
    at least one of the first and the second lead blocks includes a first base member and a second base member,
    the first base member includes a first base portion, and N terminals integrated with the first base portion, the N terminals include N first terminal portions projecting outward from the first base portion, and N second terminal portions exposed from the first base portion,
    the second base member includes a second base portion and at most N terminals integrated with the second base portion, the at most N terminals include at most N first and second external terminal portions projecting outward from the second base portion,
    respective end portions of the N conductor portions of the flexible cable are connected to the N second terminal portions of the first base member,
    the at most N respective second external terminal portions of the second base member are connected to some of the N first terminal portions of the first base member, and the at most N first external terminals are connectable to at least one external female connector, said at least one external female connector having a total number of connections equal to the at most N first external terminals, and N is at least equal to the total number of connections in the at least one external female connector.

14. A rotary connector according to claim 13, wherein the N first terminal portions of the first base member are disposed in a direction orthogonal to a lead direction of the conductor portions of the flexible cable and on a same straight line, and tips of the second external terminal portions of the second base member are disposed on a same straight line.

15. A rotary connector according to claim 13, wherein the first terminal portions of the first base member are disposed at equal intervals.

16. A rotary connector according to claim 13, wherein a hole portion is provided in the first base portion of the first base member, and the second terminal portions are exposed from the hole portion.

17. A rotary connector comprising:
  a stationary housing to which a first lead block is attached;
  a movable housing to which a second lead block is attached and which is rotatably mounted to the stationary housing; and
  a flexible cable which is accommodated in an accommodating portion formed between the stationary housing and the movable housing, and includes N conductor portions, each of the N conductor portions being connected to each of the first and the second lead blocks, wherein
    at least one of the first and the second lead blocks includes a first, a second and a third terminal blocks,
    the first terminal block includes a first base portion made of insulating material, and N first terminals embedded in and attached to the first base portion,
    the N first terminals include N terminal portions projecting outward from the first base portion, and N exposed portions electrically connected to the respective terminal portions and exposed from the first base portion, the N respective conductor portions of the flexible cable are connected to the respective exposed portions,
    the second terminal block includes a second base portion made of insulating material, and at most N second terminals embedded in and attached to the second base portion and equipped with first and second external terminal portions projecting outward from the second base portion,
    the third terminal block includes a third base portion made of insulating material, and at most N third terminals embedded in and attached to the third base portion and equipped with third and fourth external terminal portions projecting outward from the third base portion,
    each of the second and the fourth external terminal portions of the second and the third terminal blocks is connected to any one of the N terminal portions of the first terminal block, and the first and the third external terminal portions are connectable to at least one external female connector having a total number of connections equal to a sum of at most N first external terminals and the at most N third external terminals, said sum being less than or equal to N, and N is at least equal to the total number of connections in the external female connector.

18. A rotary connector according to claim 17, wherein the N first terminal portions of the first base member are disposed in a direction orthogonal to a lead direction of the conductor portions of the flexible cable and on a same straight line, and tips of the second external terminal portions of the second base member are disposed on a same straight line.

19. A rotary connector according to claim 17, wherein the first terminal portions of the first base member are disposed at equal intervals.

20. A rotary connector according to claim 17, wherein a hole portion is provided in the first base portion of the first base member, and the second terminal portions are exposed from the hole portion.

* * * * *